(12) United States Patent
Bhandari et al.

(10) Patent No.: US 8,644,174 B2
(45) Date of Patent: Feb. 4, 2014

(54) NETWORK BASED VIRTUALIZATION PERFORMANCE

(75) Inventors: Rajesh Bhandari, San Jose, CA (US); Samar Sharma, San Jose, CA (US); Sanjaya Kumar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 668 days.

(21) Appl. No.: 12/573,815

(22) Filed: Oct. 5, 2009

(65) Prior Publication Data

US 2010/0023724 A1 Jan. 28, 2010

Related U.S. Application Data

(62) Division of application No. 11/115,518, filed on Apr. 26, 2005, now Pat. No. 7,609,649.

(51) Int. Cl.
*H04J 1/16* (2006.01)
*G06F 15/167* (2006.01)
*G06F 12/00* (2006.01)

(52) U.S. Cl.
USPC .................. 370/252; 709/216; 711/162

(58) Field of Classification Search
USPC ........... 370/252, 249; 709/216, 219; 711/162, 711/156, 112, 114
See application file for complete search history.

(56) References Cited

U.S. PATENT DOCUMENTS

| | | | |
|---|---|---|---|
| 5,598,541 A | 1/1997 | Malladi | |
| 5,617,421 A | 4/1997 | Chin et al. | |
| 5,638,518 A | 6/1997 | Malladi | |
| 5,740,171 A | 4/1998 | Mazzola et al. | |
| 5,742,604 A | 4/1998 | Edsall et al. | |
| 5,764,636 A | 6/1998 | Edsall | |
| 5,809,285 A | 9/1998 | Hilland | |
| 5,999,930 A | 12/1999 | Wolff | |
| 6,035,105 A | 3/2000 | McCloghrie et al. | |
| 6,061,360 A | 5/2000 | Miller et al. | |
| 6,101,497 A | 8/2000 | Ofek | |
| 6,188,694 B1 | 2/2001 | Fine et al. | |
| 6,202,135 B1 | 3/2001 | Kedem et al. | |

(Continued)

FOREIGN PATENT DOCUMENTS

| | | |
|---|---|---|
| JP | 2000 242434 | 9/2000 |
| WO | WO 01/80013 | 10/2001 |

OTHER PUBLICATIONS

International Search Report dated Mar. 11, 2005 issued in Application No. PCT/US2003/00883.

(Continued)

*Primary Examiner* — Andrew Lee

(57) ABSTRACT

The disclosed embodiments support improvements in network performance in networks such as storage area networks. This is particularly important in networks such as those implementing virtualization. These improvements, therefore, support improved mechanisms for performing processing in network devices such as switches, routers, or hosts. These improvements include various different mechanisms which may be used separately or in combination with one another. These mechanisms include methods and apparatus for processing traffic in an arbitrated loop, performing striping to support fairness and/or loop tenancy, performing configuration of network devices such as switches to enable virtualization to be performed closest to the storage device (e.g., disk), ascertaining a CPU efficiency that quantifies the impact of virtualization on a processor, and configuring or accessing a striped volume to account for metadata stored in each storage partition.

19 Claims, 13 Drawing Sheets

(56) References Cited

U.S. PATENT DOCUMENTS

| | | |
|---|---|---|
| 6,208,649 B1 | 3/2001 | Kloth |
| 6,209,059 B1 | 3/2001 | Ofer et al. |
| 6,219,699 B1 | 4/2001 | McCloghrie et al. |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,396,832 B1 | 5/2002 | Kranzler |
| 6,400,730 B1 | 6/2002 | Latif et al. |
| 6,459,701 B1 | 10/2002 | Henson et al. |
| 6,542,961 B1 | 4/2003 | Matsunami et al. |
| 6,553,036 B1 | 4/2003 | Miller et al. |
| 6,563,818 B1 | 5/2003 | Sang et al. |
| 6,754,206 B1 | 6/2004 | Nattkemper et al. |
| 6,876,656 B2 | 4/2005 | Brewer et al. |
| 7,609,649 B1 | 10/2009 | Bhandari |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2003/0023818 A1* | 1/2003 | Archibald et al. ............ 711/154 |
| 2003/0026267 A1 | 2/2003 | Oberman et al. |
| 2003/0172149 A1 | 9/2003 | Edsall et al. |
| 2004/0085994 A1 | 5/2004 | Warren et al. |
| 2005/0125593 A1* | 6/2005 | Karpoff et al. .................... 711/4 |
| 2006/0143379 A1* | 6/2006 | Khan et al. .................... 711/114 |

OTHER PUBLICATIONS

Notice of Allowance and Allowed Claims dated Jun. 9, 2009 from U.S. Appl. No. 11/115,518.

Final Office Action dated Feb. 24, 2009, U.S. Appl. No. 11/115,518.

Office Action dated Aug. 8, 2008, U.S. Appl. No. 11/115,518.

* cited by examiner

Fairness register 202

| Switch interface 206 | Fairness indicator 204 |
|---|---|
|  |  |
|  |  |
|  |  |
|  |  |
|  |  |
|  |  |
|  |  |
|  |  |
|  |  |
|  |  |
|  |  |
|  |  |
|  |  |
|  |  |
|  |  |
|  |  |
|  |  |
|  |  |
|  |  |
|  |  |
|  |  |
|  |  |

FIG. 2

| Device 802 (e.g., virtual disk) | FCID 804 | WWN 806 |
|---|---|---|
|  |  |  |
|  |  |  |
|  |  |  |
|  |  |  |
|  |  |  |

*FIG. 8*

NETWORK BASED VIRTUALIZATION PERFORMANCE

RELATED APPLICATIONS

This application is a Divisional Application and claims priority of U.S. patent application Ser. No. 11/115,518, entitled "Methods and Apparatus for Improving Network Based Virtualization Performance," by Bhandari et al, filed on Apr. 26, 2005, which is incorporated herein by reference for all purposes.

BACKGROUND

1. Technical Field

The present disclosure relates generally to network technology. More specifically, the disclosure relates to network management and improving network based virtualization performance in a network implementing virtualization.

2. Description of the Related Art

The concept of virtual memory has traditionally been used to enable physical memory to be virtualized through the translation between physical addresses in physical memory and virtual addresses in virtual memory. Recently, the concept of "virtualization" has been implemented in storage area networks through various mechanisms. Generally, a storage area network is a high-speed special-purpose network that interconnects different data storage devices and associated data hosts on behalf of a larger network of users. However, although a SAN enables a storage device to be configured for use by various network devices and/or entities within a network, data storage needs are often dynamic rather than static.

Within a storage area network, it is possible to couple a set of hosts (e.g., servers or workstations) to a pool of storage devices (e.g., disks). In SCSI parlance, the hosts may be viewed as "initiators" and the storage devices may be viewed as "targets." A storage pool may be implemented, for example, through a set of storage arrays or disk arrays. Each disk array further corresponds to a set of disks. Rather than enabling all hosts to access all disks, it is desirable to enable the dynamic and invisible allocation of storage (e.g., disks) to each of the hosts via the disk arrays. In other words, physical memory (e.g., physical disks) may be allocated through the concept of virtual memory (e.g., virtual disks). This allows one to connect heterogeneous initiators to a distributed, heterogeneous set of targets (storage pool) in a manner enabling the dynamic and transparent allocation of storage.

Virtualization interconverts physical storage and virtual storage on a storage area network. The hosts (initiators) see virtual disks as targets. The virtual disks represent available physical storage in a defined but somewhat flexible manner. Virtualization provides hosts with a representation of available physical storage that is not constrained by certain physical arrangements/allocation of the storage.

Virtualization in the storage subsystem is one of the most common storage virtualization solutions in use today. Through this approach, virtual volumes are created over the storage space of a specific storage subsystem (e.g., disk array). Creating virtual volumes at the storage subsystem level provides host independence, since virtualization of the storage pool is invisible to the hosts. In addition, virtualization at the storage system level enables optimization of memory access and therefore high performance. However, such a virtualization scheme typically will allow a uniform management structure only for a homogenous storage environment and even then only with limited flexibility. Further, since virtualization is performed at the storage subsystem level, the physical-virtual limitations set at the storage subsystem level are imposed on all hosts in the storage area network. Moreover, each storage subsystem (or disk array) is managed independently. Virtualization at the storage level therefore rarely allows a virtual volume to span over multiple storage subsystems (e.g., disk arrays), thus limiting the scalability of the storage-based approach.

Another approach to virtualization in common use is the host-based approach. When virtualization is implemented on each host, it is possible to span multiple storage subsystems (e.g., disk arrays). The host-based approach has an additional advantage, in that a limitation on one host does not impact the operation of other hosts in a storage area network. However, virtualization at the host-level requires the existence of a software layer running on each host (e.g., server) that implements the virtualization function. Running this software therefore impacts the performance of the hosts running this software. Another key difficulty with this method is that it assumes a prior partitioning of the available storage to the various hosts. Since such partitioning is supported at the host-level and the virtualization function of each host is performed independently of the other hosts in the storage area network, it is difficult to coordinate storage access across the hosts. The host-based approach therefore fails to provide an adequate level of security. Due to this security limitation, it is difficult to implement a variety of redundancy schemes such as RAID which require the "locking" of memory during read and write operations. In addition, when mirroring is performed, the host must replicate the data multiple times, increasing its input-output and CPU load, and increasing the traffic over the SAN.

Virtualization in a storage area network appliance placed between the hosts and the storage, referred to as "network-based virtualization," solves some of the difficulties of the host-based and storage-based approaches. The storage appliance globally manages the mapping and allocation of physical storage to virtual volumes. Typically, the storage appliance manages a central table that provides the current mapping of physical to virtual. Thus, the storage appliance-based approach enables the virtual volumes to be implemented independently from both the hosts and the storage subsystems on the storage area network, thereby providing a higher level of security. Moreover, this approach supports virtualization across multiple storage subsystems.

As set forth above, network-based virtualization (NBV) offloads the virtualization tasks such as mapping and locking from the host (or storage appliances) to the intelligent network. Specifically, virtualization tasks are implemented at a network device such as a switch. One method and system of implementing virtualization in a storage area network by a network device such as a switch are disclosed in application Ser. No. 10/056,238, entitled "Methods and Apparatus for Implementing Virtualization of Storage within a Storage Area Network," filed on Jan. 23, 2002, by Gai et al and application Ser. No. 10/242,374, entitled "Methods and Apparatus for Implementing Exchange Management for Virtualization of Storage within a Storage Area Network," filed on Sep. 11, 2002, by Chandrasekaran, et al.

While network-based virtualization offloads the virtualization tasks to the intelligent network, this requires further processing to be performed within the network. As a result, network-based virtualization often substantially impacts the performance within the network. The key drawback of many implementations of this architecture is that every input/output (I/O) of every host must be sent through the storage area network appliance, causing significant performance degradation and a storage area network bottleneck. This is particularly disadvantageous in systems supporting a redundancy scheme such as RAID, since data must be mirrored across multiple disks. In another storage appliance-based approach, the appliance makes sure that all hosts receive the current version of the table. Thus, in order to enable the hosts to receive the table from the appliance, a software shim from the appliance to the hosts is required, adding to the complexity of the system. Moreover, since the software layer is implemented on the host, many of the disadvantages of the host-based approach are also present.

In view of the above, it would be beneficial if network-based virtualization performance could be improved.

SUMMARY

Various embodiments support improvements in network performance in a system implementing network-based virtualization. This is particularly important in networks implementing virtualization within network devices such as switches (or routers). These improvements, therefore, support improved mechanisms for performing processing in network devices such as switches, routers, or hosts. The improvements set forth below may be implemented separately or in combination with one another.

In accordance with a first aspect, methods and apparatus for processing traffic in an arbitrated loop in a Fibre Channel network are set forth. More particularly, the embodiments disclosed support the implementation of loop fairness within an arbitrated loop, as well as the configuration of loop tenancy associated with the arbitrated loop. When fairness is implemented or enabled within the arbitrated loop, a requesting entity on the arbitrated loop may send an arbitration request forcing a transmitting entity that is transmitting frames on the arbitrated loop to relinquish control of the arbitrated loop. Loop tenancy is generally understood to refer to the maximum number of frames that a port can send before it has to relinquish control of the loop if another entity has sent an arbitration request.

In accordance with one embodiment, the implementation of fairness and loop tenancy are mutually exclusive. In other words, the enabling of fairness within an arbitrated loop enables an entity on the arbitrated loop to gain control of the arbitrated loop immediately, while loop tenancy enables a transmitting entity (e.g., port) receiving an arbitration request to send up to a maximum number of frames before it must relinquish control of the arbitrated loop. Thus, when fairness is not set, a port such as a Fabric Loop (FL) port may determine when it should relinquish control in accordance with the loop tenancy configuration.

In accordance with yet another embodiment, methods and apparatus for processing traffic in an arbitrated loop of a network are disclosed. First, it is ascertained whether a switch implementing network-based virtualization is coupled to the arbitrated loop. When a switch implementing network-based virtualization is coupled to the arbitrated loop, fairness is enabled. Specifically, a fairness indicator associated with the arbitrated loop is set, where the fairness indicator indicates that fairness is enabled when the fairness indicator is in a first state and indicates that fairness is disabled when the fairness indicator is in a second state. The fairness indicator is also associated with an interface of the switch that is coupled to the arbitrated loop. When a switch implementing network-based virtualization is not coupled to the arbitrated loop, a loop tenancy associated with the arbitrated loop is configured.

In accordance with one embodiment, the loop tenancy is configured by ascertaining an average I/O size associated with the arbitrated loop and determining a number of simultaneous operations on the loop. The loop tenancy is then configured such that it is directly proportional to the average I/O size and inversely proportional to the number of simultaneous operations on the loop.

In accordance with another embodiment, methods and apparatus for processing traffic in an arbitrated loop of a network are set forth to support the implementation of fairness within an arbitrated loop. Specifically, a status of a fairness indicator associated with the arbitrated loop is identified, where the fairness indicator indicates that fairness is enabled when the fairness indicator is in a first state and indicates that fairness is disabled when the fairness indicator is in a second state. A requesting entity on the arbitrated loop is enabled to send an arbitration request when the fairness indicator is in the first state, the arbitration request forcing a transmitting entity that is transmitting frames on the arbitrated loop to relinquish control of the arbitrated loop. However, when the fairness indicator is in the second state, entities on the arbitrated loop are prevented from sending an arbitration request.

In accordance with yet another embodiment, a switch having a plurality of interfaces configured to process traffic in an arbitrated loop of a network includes a processor and a memory, as well as a data structure or register including a fairness indicator associated with each of the plurality of interfaces of the switch. The fairness indicator associated with each interface indicates that fairness is enabled for the corresponding interface when the fairness indicator is in a first state and indicates that fairness is disabled for the corresponding interface when the fairness indicator is in a second state.

In accordance with a second aspect, striping is performed to maximize the throughput in a network such as a network supporting network-based virtualization. Striping is a technique used for spreading data over multiple storage devices (e.g., disk drives). Striping is commonly performed to speed up operations that retrieve data from disk storage. For instance, when data is "striped" across multiple disk drives, the data is broken into units and spread across the disk drives (or those which are available). Striping generally entails receiving an input or output request from a host, and obtaining or storing the data, respectively, by simultaneously "striping" across multiple storage devices (e.g., disks), which are often referred to as "columns." The stripe size refers to the size of a stripe of data that is stored in a column. For instance, each disk may be referred to as a "column" and the amount of data that is stored in each "column" before moving to the next is the stripe size or "stripe width." In a network supporting virtualization, the input/output request identifying a virtual storage location is therefore converted to a physical storage location for each stripe of data. For instance, the virtual storage location may refer to a "volume" which may include data stored in a single disk partition or multiple partitions on one or more physical drives.

In a Fibre Channel network in which network-based virtualization is implemented, a host sends a request such as a read or write request that identifies a virtual storage location. The network device (e.g., switch) receiving the request converts the virtual storage location to one or more physical storage locations before the read/write is striped across the physical storage locations. An operation such as a write or read operation consists of a host-side exchange and a disk-side exchange. Specifically, the host-side exchange is performed between the host and network device (e.g., switch), while the disk-side exchange is performed between the network device and storage devices (e.g., disks). While a sequence is a set of one or more related frames, an exchange is one or more non-concurrent sequences for a single operation. One system supporting exchange management in a SAN implementing virtualization is disclosed in application Ser. No. 10/056,238, entitled "Methods and Apparatus for Implementing Virtualization of Storage within a Storage Area Network," filed on Jan. 23, 2002, by Gai et al.

In accordance with one embodiment, methods and apparatus for performing striping include identifying a stripe size, the stripe size being a size of data to be written to or read from one of the plurality of columns. A host IO size is determined, where the host IO size is a size of data to be received from or transmitted to a host, thereby enabling the data to be stored to or read from storage including a plurality of columns. The host IO size is then set to identify an amount of data to be received from or transmitted to the host. Data is obtained from the host or transmitted to the host, where the size of the data obtained or transmitted conforms to the host IO size. Striping is performed across the plurality of columns for the data obtained from the host or transmitted to the host such that data written to or read from one of the plurality of columns conforms to the stripe size.

In accordance with another embodiment, the host IO size is calculated using the stripe size, the remaining amount of data to be transmitted, and the number of columns. Specifically, a minimum of the size of the remaining data associated with the host IO and the product of the stripe size and the number of columns is identified. When the minimum is a size of the remaining data associated with the host IO, the host IO size is the size of the remaining data. Alternatively, when the minimum is a product of the stripe size and the number of columns, the host IO size is the product of the stripe size and the number of columns.

In accordance with another embodiment, methods and apparatus for performing striping across a plurality of columns includes receiving a command from a host, where the command is a request to store or retrieve data and the command indicates a size of the data to be stored or retrieved. It is ascertained whether the size of the data associated with the command is greater than a product of a configured stripe size and number of the plurality of columns. When the size of the data associated with the command is not greater than the product of the configured stripe size and the number of columns, striping is performed according to the configured stripe size. When the size of the data associated with the command is greater than the product of the configured stripe size and the number of columns, a host IO size is determined and set, and data conforming to the host IO size is obtained from the host or transmitted to the host by performing striping across a plurality of columns, where the data written to or read from each of the plurality of columns conforms to the configured stripe size.

In accordance with another embodiment, the host IO that is received identifies a virtual storage location and the plurality of columns are associated with a plurality of physical storage locations. For instance, in a storage area network, virtual storage locations may be referred to as virtual logical units (VLUNs), while physical storage locations may be referred to as physical logical units (PLUNs).

In accordance with a third aspect, virtualization within a network is supported by enabling virtualization functionality to be performed at a network device (e.g., switch) closest to the pertinent target (e.g., disk). This may be accomplished by configuring the appropriate information for various targets on multiple switches, rather than requiring a particular disk to be served by a specific switch. Once the switches are configured with the appropriate information, the switches may send advertisements advertising both a virtual and physical address associated with each disk. From the advertisement, a host may send a read or write command to the switch that it deems to be closest to it.

In accordance with one embodiment, methods and apparatus for supporting virtualization in a network include sending by a network device such as a switch an advertisement including device information for one or more devices, where the device information for each of the devices identifies a physical address and a virtual address, thereby enabling a host receiving the advertisement to obtain the physical address associated with the virtual address for one of the devices. Once the host sends a command identifying the physical address, the network device receives the command(s) and forwards the command(s) to the appropriate physical address (es).

In accordance with another embodiment, a network supporting virtualization includes multiple switches configured with the same device information, thereby enabling each of the switches to service a host that it is closest to. In this manner, each switch has the virtual-physical address information to support any request received from a host. For instance, two or more switches may be configured to store device information for a plurality of devices, where the device information for each of the plurality of devices identifies a physical address and a virtual address. In addition, each of the switches is configured to send an advertisement including the device information for at least one of the plurality of devices, thereby enabling a host receiving the advertisement to obtain the physical address associated with the virtual address for one of the plurality of devices. Configuration may be performed statically, as well as dynamically.

In accordance with a fourth aspect, the "CPU efficiency" of a CPU may be ascertained. This may be accomplished by measuring data associated with the utilization of the CPU during host inputs and/or outputs such as those performed in a network implementing virtualization. In this manner, the impact of virtualization on a CPU may be determined.

In accordance with one embodiment, the I/O throughput associated with the CPU is determined by measuring an amount of total data input and/or output during a particular period of time. The CPU time for the CPU to complete the set of inputs and/or outputs associated with the data during the period of time is also ascertained. The CPU time is divided by the test period of time to obtain the CPU utilization. The I/O throughput is then divided by the CPU utilization to obtain the CPU efficiency associated with the CPU.

In accordance with a fifth aspect, striping is performed to account for metadata stored at the beginning of partitions in storage devices such as disks. This may be accomplished by configuring a network device such as a switch to accurately calculate the start address of a partition, the data region within the partition, or the metadata region within the partition. In this manner, the speed with which memory may be accessed is improved.

In accordance with one embodiment, methods and apparatus for configuring a striped volume in which both metadata and data are stored in a storage area network are disclosed to enable the start address of a partition in a storage volume to be ascertained. First, the striped volume in which both metadata and data are stored is identified. In addition, the size of the metadata region stored for each partition in the striped volume and the stripe size for data stored in the storage area network are ascertained. A start address for a partition in the striped volume may then be determined. The start address for the partition in the striped volume is a stripe-aligned address at which data is stored less a sum of the metadata region size for the partition. The start address for the partition may or may not be stripe-aligned.

In accordance with another embodiment, methods and apparatus for configuring a striped volume in which both metadata and data are stored in a storage area network are set forth to enable the application data start address to be ascertained. First, the striped volume in which both metadata and data are stored is identified. The size of the metadata stored for each partition in the striped volume is ascertained. In addition, the stripe size for data stored in the storage area network is also ascertained. An application data start address identifying a start address at which data is stored is then ascertained, where the application data start address is the sum of the start address for the partition in the striped volume and the metadata region size for the partition. The start address at which data is stored is a stripe-aligned address.

These and other features and advantages of the disclosed embodiments will be presented in more detail in the following specification and the accompanying figures, which illustrate by way of example the principles of the disclosed embodiments.

BRIEF DESCRIPTION OF THE DRAWINGS

FIG. 2 is a diagram illustrating an example data structure or register maintained by a MAC device of the switch illustrated in FIG. 1, where the MAC device controls fairness on interfaces of switch.

FIG. 8 is a diagram illustrating an example table configured on a switch in accordance with one embodiment.

DESCRIPTION OF EXAMPLE EMBODIMENTS

Figure 1:
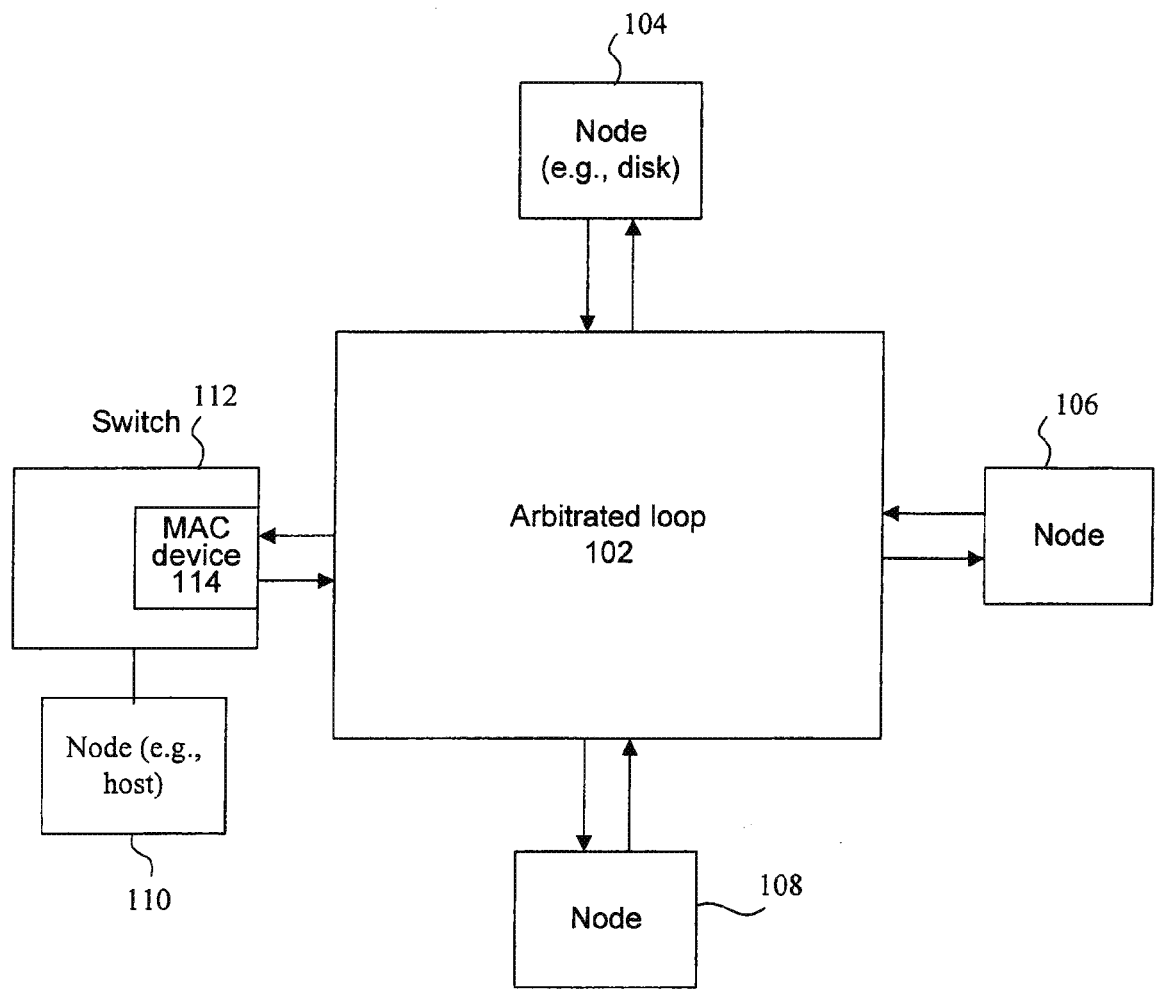
FIG. 1 is a diagram illustrating an arbitrated loop implemented in a Fibre Channel network.

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

In accordance with various embodiments, network-based virtualization performance is improved. This may be accomplished through a variety of performance improvement schemes, which may be used separately or in combination with one another. In the description below, each of these performance improvement schemes will be described separately.

In accordance with one aspect, loop fairness may be enabled or disabled within an arbitrated loop within a Fibre Channel network. Alternatively, a loop tenancy associated with the arbitrated loop may be configured. When fairness is implemented or enabled within the arbitrated loop, a requesting entity on the arbitrated loop may send an arbitration request forcing a transmitting entity that is transmitting frames on the arbitrated loop to relinquish control of the arbitrated loop. If fairness is not set, then the corresponding Fabric Loop (FL) port coupled to the transmitting entity determines when it should relinquish control of the loop. Loop tenancy is generally understood to refer to the maximum number of frames that a port can send before it has to relinquish control of the loop if another entity has sent an arbitration request. Thus, when loop tenancy is configured, a transmitting entity coupled to the FL port can send up to the maximum number of frames before it must relinquish control of the arbitrated loop to the entity that has sent the arbitration request.

The arbitrated loop is a very common topology in a Fibre Channel network. The arbitrated loop may, for example, be used to communicate with targets in a Storage Area Network (SAN). Specifically, in an arbitrated loop implemented in a Fibre Channel network, up to 127 devices may be attached to a loop, but only two devices can communicate with one another at the same time. To communicate with a device that is several hops down the loop, each device repeats the data to its adjacent node.

Typically, when a device is ready to transmit data in an arbitrated loop, it first must arbitrate and gain control of the Loop. It does this by transmitting the Arbitrate (ARBx) Primitive Signal, where x=the Arbitrated Loop Physical Address of the device. Once a device receives its own ARBx Primitive Signal, it has gained control of the Loop and can now communicate with other devices by transmitting an Open (OPN) Primitive Signal to a destination device. Once this happens, there essentially exists point-to-point communication between the two devices. All other devices in between simply repeat the data.

When fairness is not enabled, there is no limit on how long a device may retain control of the Loop. This demonstrates the "channel" aspect of Fibre Channel. There is, however, an Access Fairness Algorithm. Generally, when fairness is enabled, the Access Fairness Algorithm prohibits a device from arbitrating again until all other devices have had a chance to arbitrate.

FIG. 1 is a diagram illustrating an arbitrated loop implemented in a Fibre Channel network. Within an arbitrated loop 102, multiple nodes (e.g., disks) 104, 106, 108 may receive and transmit frames. For instance, a host 110 may send a WRITE or READ command via a switch 112 to one or more nodes on the arbitrated loop 102. A switch is not required to be connected to an arbitrated loop. Thus, in accordance with one embodiment, it is determined whether the loop is coupled to a switch implementing network-based virtualization. This determination governs whether loop fairness or loop tenancy is configured, as will be described in further detail below.

In addition, in accordance with one embodiment, the concept of "loop fairness" is implemented. Specifically, a requesting entity on the loop may send an arbitration request forcing another transmitting entity that is transmitting frames on the arbitrated loop to relinquish control of the arbitrated loop at any time when fairness is enabled for that particular port (e.g., FL port) of the switch that is coupled to the arbitrated loop. For instance, a fairness indicator may indicate whether fairness is enabled or disabled. The fairness indicator may be set for one or more ports associated with a particular switch. For instance, the fairness indicator may be set in a first state to indicate that fairness is enabled and set in a second state to indicate that fairness is disabled.

When fairness is not enabled for a particular loop (e.g., the corresponding fairness indicator associated with a port of the switch is not set), loop tenancy is configured for the arbitrated loop. As set forth above, loop tenancy generally refers to the maximum number of frames that a port such as a Fabric Loop (FL) port can send before it has to relinquish control of the loop if another entity has sent an arbitration request.

The configuration of fairness indicator(s) for a particular switch may be accomplished via software and/or hardware provided in the switch. For instance, a MAC device 114 of the switch 112 may be responsible for storing and/or accessing fairness indicators for the switch 112. Similarly, the MAC device 114 may support the configuration of the fairness indicators for the switch 112.

As set forth above, a fairness indicator may be associated with each interface of a switch. The fairness indicator(s) may be stored in a variety of data structures and formats. Moreover, fairness indicator(s) may be stored in one or more data structures associated with one or more interfaces of a switch.

FIG. 2 is a diagram illustrating an example data structure or register for storing fairness indicator information for interfaces of a switch. As shown in FIG. 2, a data structure or fairness register 202 may be used to store the fairness indicator 204 associated with each interface 206 of the switch. For instance, the fairness indicator 204 may be implemented as a single bit.

In accordance with one embodiment, software associated with the MAC device can control the fairness on a particular port of the switch. For instance, the MAC device may export an application programming interface (API), which enables a software driver to instruct various interfaces of the switch to implement fairness (or not implement fairness) on the corresponding arbitrated loop. For instance, the software driver may submit a parameter via the API to the MAC device that indicates whether fairness is to be enabled/disabled for a particular interface or interfaces. In response, the MAC device updates the fairness data structure(s) or register(s), as appropriate.

As set forth above, the fairness indicator (or bit) may be set by an intelligent application. For instance, the application may provide the fairness indicator for one or more ports of a particular switch by sending a set of parameters via an API, as set forth above. The intelligent application may ascertain whether the fairness indicator is to be set (e.g., enabled) for each arbitrated loop in a network.

Figure 3:
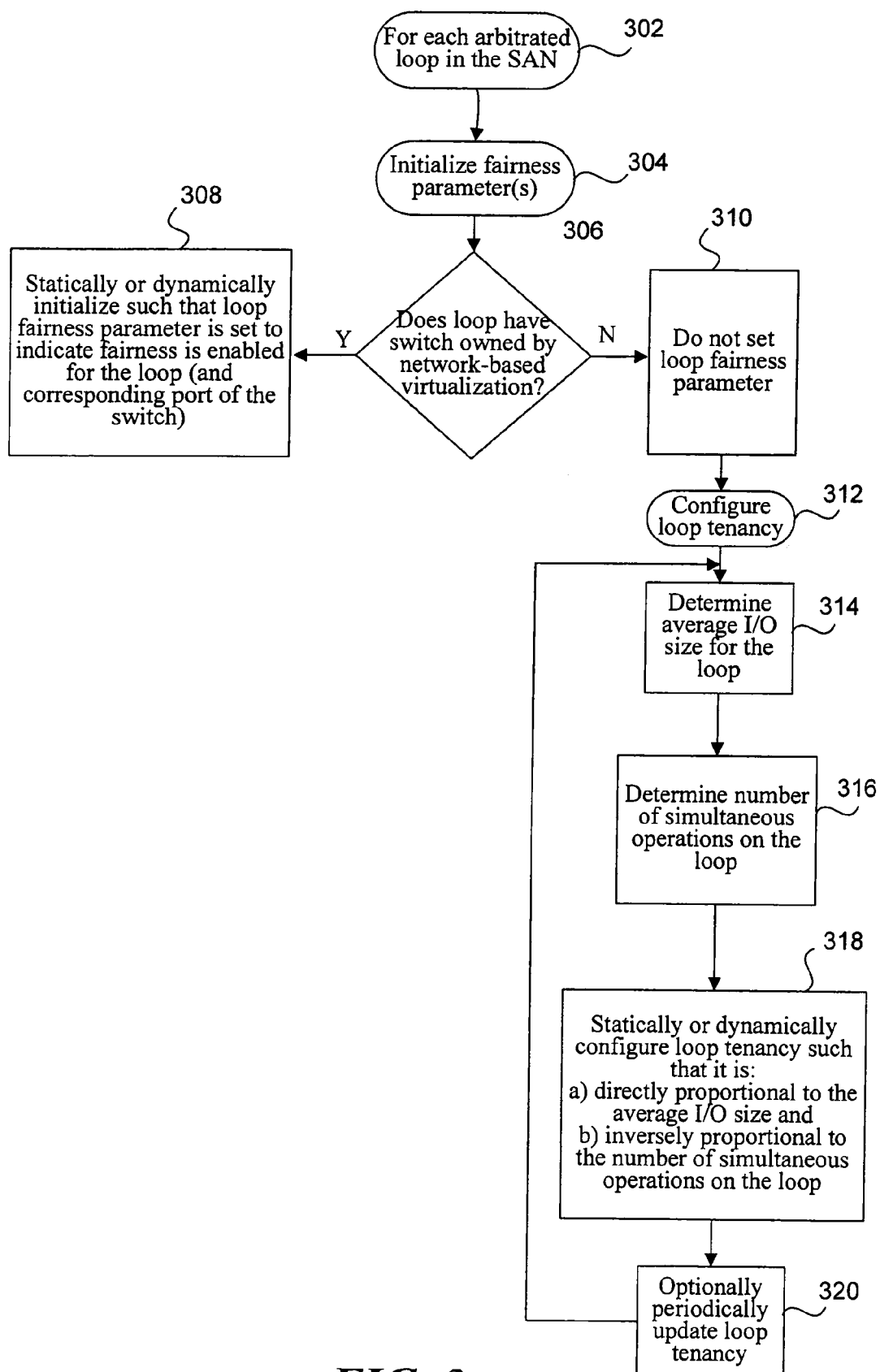
FIG. 3 is a process flow diagram illustrating a method of controlling fairness on interfaces of a switch in accordance with one embodiment.

Fairness within an arbitrated loop may be controlled via a variety of methods. FIG. 3 is a process flow diagram illustrating one method of controlling fairness on interfaces of a switch in accordance with one embodiment. This process may be performed for one or more arbitrated loops in a particular network. In this example, the process is performed for each arbitrated loop in the network (e.g., SAN), as shown at 302. As set forth above, the fairness setting for each arbitrated loop (and associated switch interface) may be established via a parameter through the API. In or to initialize these fairness parameters (or settings) for the switch interfaces at 304, it is determined whether the arbitrated loop has a switch owned by network-based virtualization at 306. In other words, the process determines whether a switch is coupled to the arbitrated loop. If so, then it is determined whether that switch performs virtualization functionality (e.g., virtual-physical address mapping).

If the loop has a switch owned by network-based virtualization, the fairness parameter or indicator is initialized to indicate that loop fairness is enabled for the loop (and corresponding port of the switch) at 308. If the loop does not have a switch owned by network-based virtualization, a loop fairness parameter is not set for the loop at 310. However, loop tenancy is configured as shown at blocks 312-320. Specifically, an average I/O size for the loop is determined at block 314. For instance, the average I/O size may be ascertained by sampling the number of frames transmitted via the loop during a period of time and dividing the number of frames by that time period. The number of simultaneous operations on the loop is also determined at block 316. For instance, the number of connections associated with each entity on the loop may be identified to ascertain the total number of simultaneous operations on the loop. The loop tenancy is then statically or dynamically configured such that it is a) directly proportional to the average I/O size and b) inversely proportional to the number of simultaneous operations on the loop. The loop tenancy may be periodically updated as shown at block 322 by performing steps 314-320. For instance, the average I/O size and number of simultaneous operations on the loop may be sampled every second. Once ascertained, the loop tenancy may be rounded, as appropriate.

The method described above with respect to FIG. 3 enables throughput in a SAN to be maximized for arbitrated loops. For instance, the method enables the loop tenancy to be modified to accommodate a large average I/O size by increasing the loop tenancy. Similarly, the method accommodates a large number of simultaneous operations on the loop by reducing the loop tenancy.

Figure 4A:
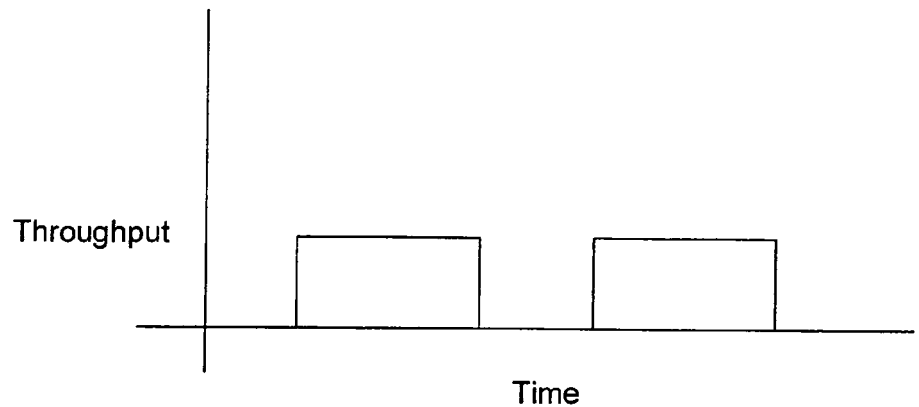
FIG. 4A is a diagram illustrating the throughput of an arbitrated loop over time using a standard fairness implementation scheme.

FIG. 4A is a diagram illustrating the throughput of an arbitrated loop over time in a network such as a SAN using a standard fairness implementation scheme. As shown, the throughput is not optimized, since fairness is generally set such that fairness is always enabled (or disabled).

Figure 4B:
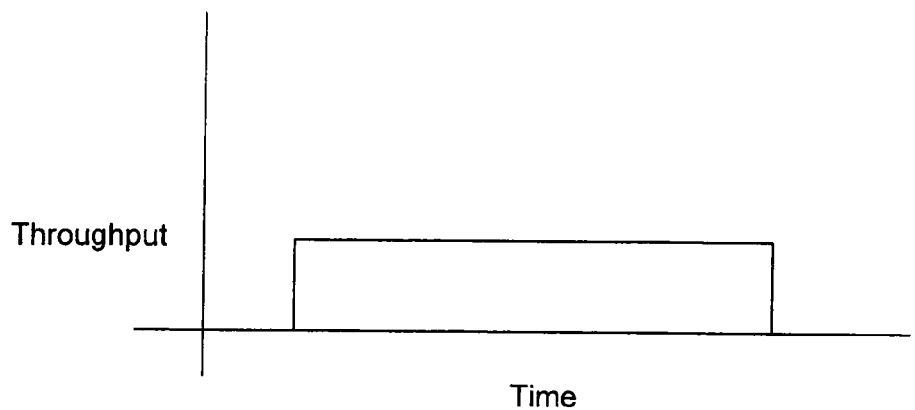
FIG. 4B is a diagram illustrating the throughput of an arbitrated loop over time using a method of controlling fairness in an arbitrated loop such as that described with reference to FIG. 3.

In contrast, FIG. 4B is a diagram illustrating the throughput of an arbitrated loop over time using a method of controlling fairness in an arbitrated loop in accordance with an embodiment such as that described above with reference to FIG. 3. Since an intelligent application may dynamically turn fairness on or off for a particular interface, throughput may be optimized via an intelligent application.

In accordance with another aspect, the throughput of striped volumes is maximized in a system such as that implementing network-based virtualization. Specifically, random I/Os to disk significantly degrade the performance of the system, as compared to sequential I/Os. This is due, in part, to the slow speed with which the spindle moves to access a memory location of a disk. Thus, performance is improved by setting the size of the data transmitted between the host and network device (e.g., switch), which will be referred to as the "host IO size," to optimize performance. This enables the number of random I/Os to disk to be reduced. In order to illustrate the distinction between prior art methods of striping and the disclosed embodiments, striping will be described with reference to FIG. 5A and FIG. 5B.

Figure 5A:
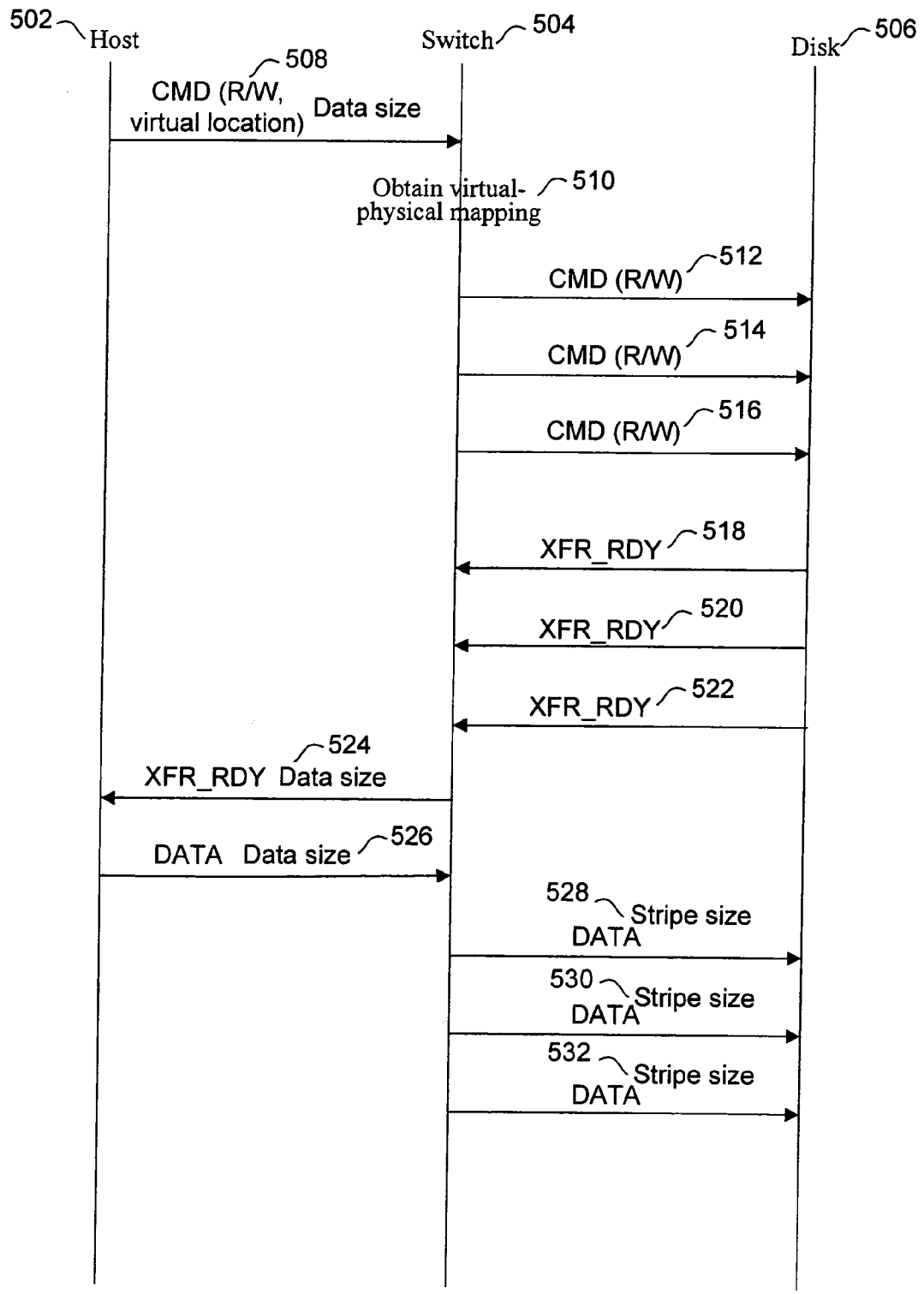
FIG. 5A is a transaction flow diagram illustrating a method of performing striping in a network-based virtualization system.

FIG. 5A is a transaction flow diagram illustrating a prior art method of performing striping in a network-based virtualization system. Functions performed by the host, switch, and disk are represented by vertical lines 502, 504, and 506, respectively. When a host sends a command (i.e., request) such as a read or write command at 508, it identifies a virtual location within a virtual storage system and also indicates the size of the data to be obtained from or stored to the virtual storage system. Upon receiving this command, the switch generally obtains a virtual-physical mapping at 510 and sends a read or write command indicating the total amount of data to be transferred to each of the columns, as appropriate, to the appropriate columns (e.g., disks) at 512, 514, 516. The disks then send a transfer ready (XFR_RDY) at 518, 520, 522 indicating that they are ready for the data transfer, in accordance with the Fibre Channel protocol. For instance, the transfer ready command is generally sent for a write command, but need not be sent for a read command.

When the disks are ready to receive data in the case of a write command, the switch sends a corresponding XFR_RDY command to the host at 524 indicating that the entire amount of data (e.g., the entire amount corresponding to the initial command) can now be transferred by the host to the switch (in accordance with a write operation). The host then transfers the entire amount of data to the switch at 526. The data is then broken up by the switch and striped across the columns at 528, 530, 532 during one or more parallel operations during which data is striped across the columns, 530, 532.

During the striping process in a system implementing network-based virtualization, a host I/O often results in random I/Os to the disks. For example, a 64 MB write to a striped volume with stripe size 64 KB and number of columns 8 would result in 128 I/Os to each column. Depending upon when these I/Os arrive to a disk, they might result in the disk seeking non-sequential memory locations. Thus, in accordance with various embodiments, network-based virtualization functionality is designed to avoid causing random I/Os to disks if the host is attempting a sequential I/O. This is accomplished, in part, by splitting a host I/O into smaller host I/Os. Specifically, the host side I/O size is chosen to optimize performance and avoid any non-sequential memory access to the physical disks.

Figure 5B:
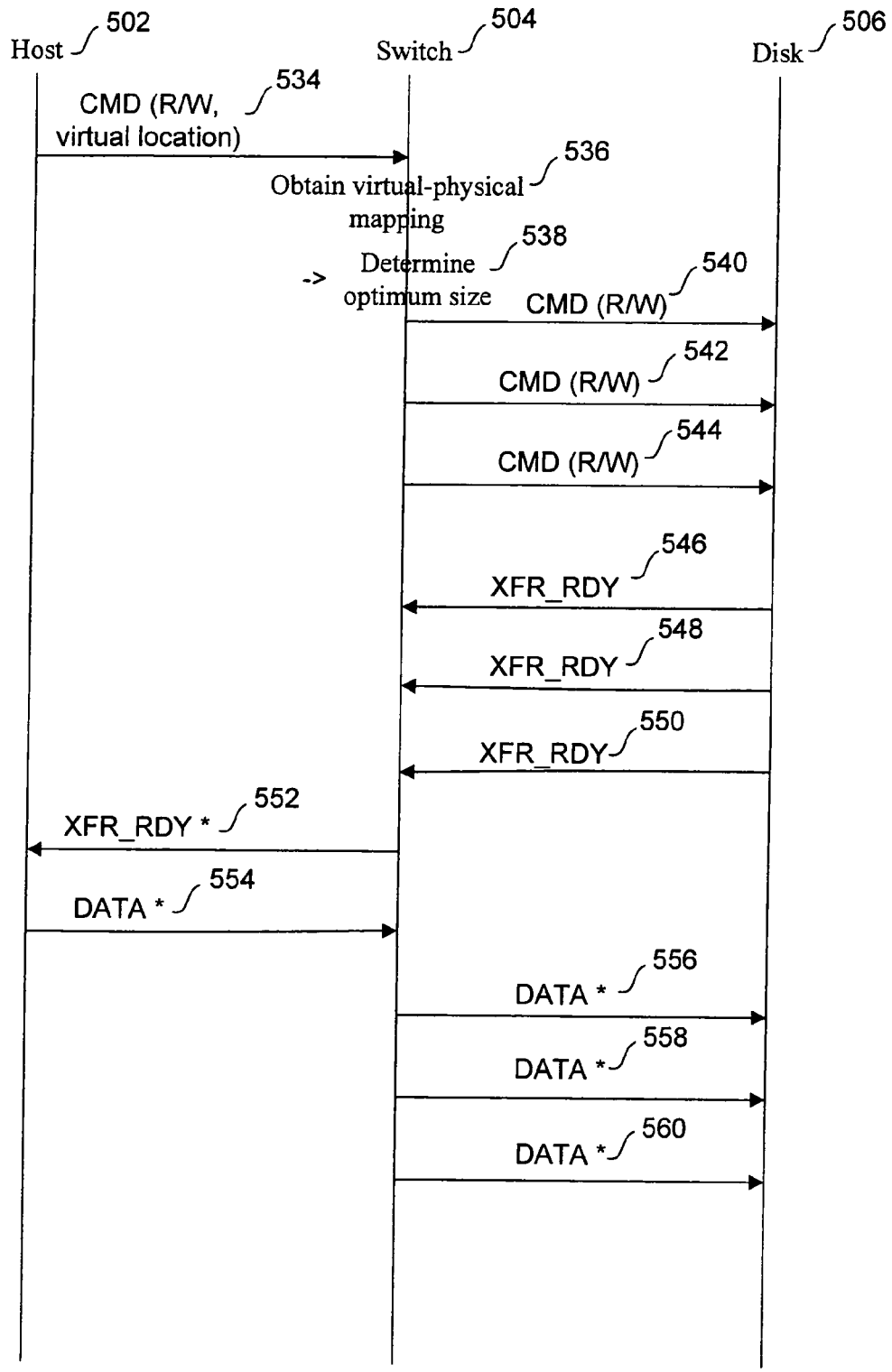
FIG. 5B is a transaction flow diagram illustrating a method of performing striping in accordance with one embodiment.

FIG. 5B is a transaction flow diagram illustrating a method of performing striping in accordance with one embodiment. As shown, when a command (e.g., read/write) indicating a data size is received from the host at 534, the switch obtains a virtual-physical mapping at 536 and determines an optimum host I/O size at 538. The switch also sends a corresponding command to the disks at 540, 542, 544, where each command indicates that the transfer size is the stripe size. Each disk sends a XFR_RDY command at 546, 548, 550 indicating that the transfer can now be performed.

In accordance with one embodiment, instead of sending a XFR_RDY command to the host indicating that the entire amount of data can be transferred, the switch sends a XFR_RDY command to the host at 552 indicating that the host IO size is the optimum host I/O size. This may be accomplished, for example, through an iterative process until all data has been transferred. The data conforming to the host IO size is then transmitted by the host at 554 (in accordance with a write operation). The data is then striped at 556, 558, 560 across the disks, as shown. This process may then be repeated until all data has been transferred.

Figure 6:
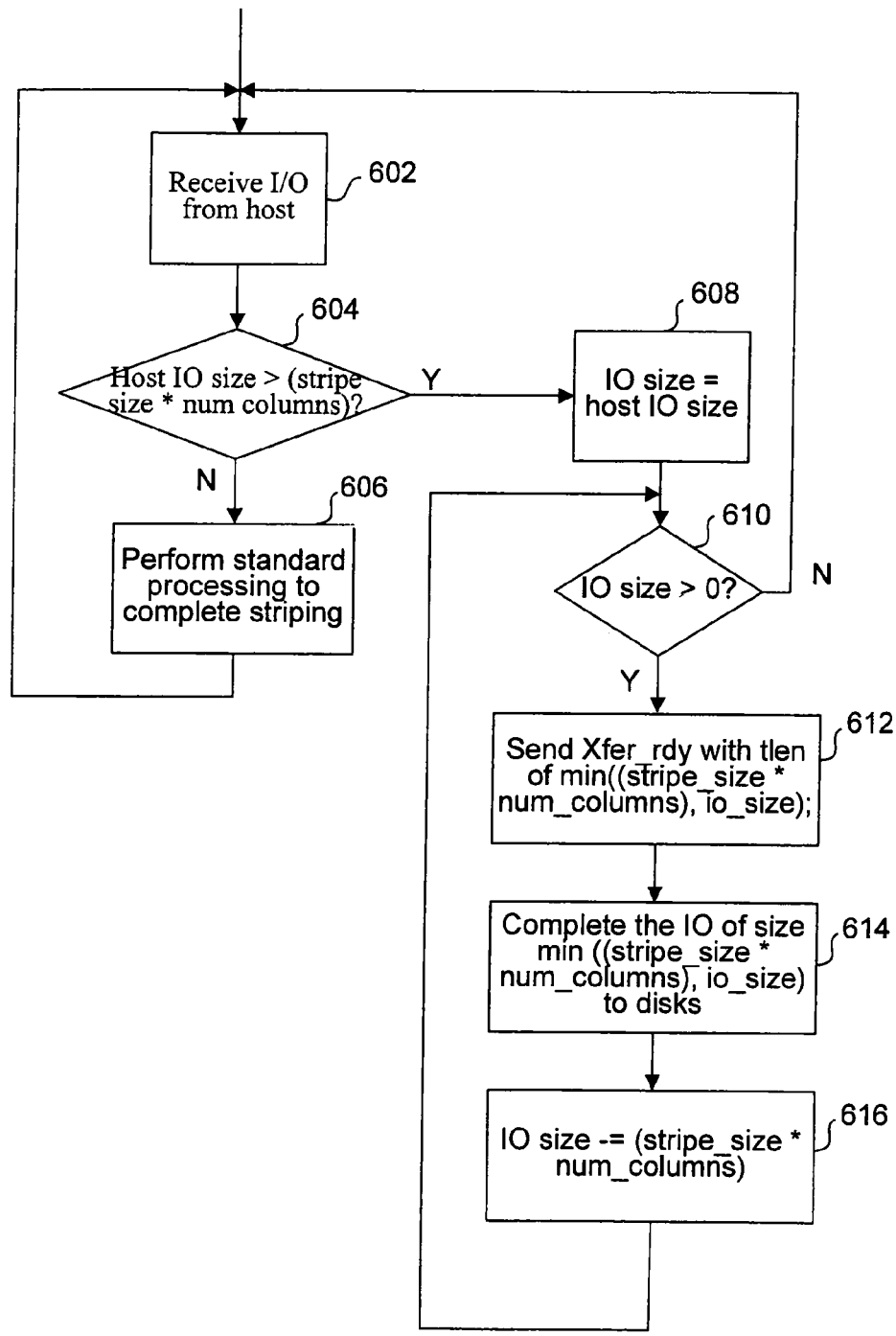
FIG. 6 is a process flow diagram illustrating a method of maximizing throughput of striped volumes in a network implementing network-based virtualization in accordance with one embodiment.

FIG. 6 is a process flow diagram illustrating a method of maximizing throughput of striped volumes in a network implementing network-based virtualization in accordance with one embodiment. When an I/O request (e.g., read or write) is received from a host at 602, the size of the host I/O indicated in the I/O request received from the host is compared to the product of the stripe size and the number of columns at 604. If the size of the host I/O is less than the product of the stripe size and the number of columns, standard processing is performed to complete striping at 606. However, if the size of the host I/O is greater than the product of the stripe size and the number of columns, the size of the remaining data to be transferred, represented by the variable "IO size," is initialized to the host IO size at 608. If the IO size is not greater than zero at 610, the process is completed for that particular host I/O request and continues at 602 for any additional I/O requests. If the IO size is greater than zero at 610, the process continues at 612 to send a XFR_RDY command to the host with a transfer length of a minimum of the IO size and the product of the stripe size and the number of columns. The I/O is completed at 614 for the minimum of the IO size and the product of the stripe size and the number of columns to the disks. For instance, for a WRITE command, the data conforming to the minimum of the IO size and the product of the stripe size and the number of columns is received from the host. The data is then striped (according to the configured stripe size) across the columns. The IO size representing the remaining data to be transferred is then reduced by the amount of data that has been striped, which is equal to the product of the stripe size and the number of columns at 616. The process then repeats at 610 until all of the data has been transferred, according to the READ or WRITE command received from the host.

The method described with reference to FIG. 6 results in optimal performance. This may be understood by determining that the average host I/O size should be approximately the product of the stripe size and the number of columns to obtain optimal performance. (This equation may also be used to calculate the stripe size). In other words, if the average host I/O size is too small, then all of the disk spindles will not be used in parallel. Similarly, if the average host I/O size is too big, then this would result in non-sequential I/Os to the disk.

In accordance with yet another aspect, configuration of network devices (e.g., switches) within a network implementing network-based virtualization is performed to enable the network device (e.g., switch) that is closest to the storage devices (e.g., disks) to perform virtualization functions such as mirroring. This is particularly important, since each host side IO generally results in multiple disk side IOs.

Figure 7:
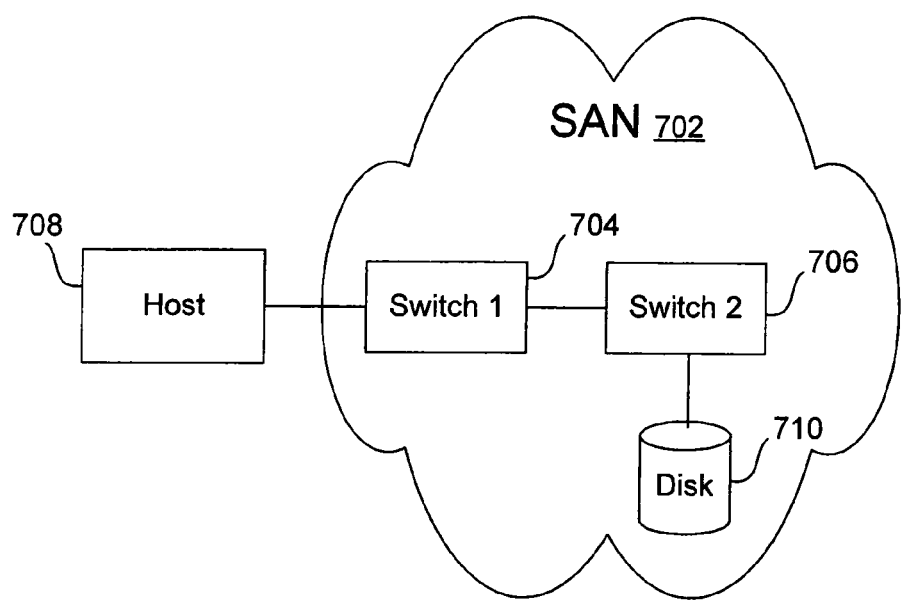
FIG. 7 is a diagram illustrating an example system in which virtualization functions are performed by a switch.

FIG. 7 is a diagram illustrating an example system in which virtualization functions are performed by a switch. As shown in FIG. 7, a SAN 702 generally includes multiple switches, such as switch 1 704 and switch 2 706. When a host 708 sends a READ or WRITE command at 708 directed to a virtual storage location, that virtual storage location corresponds to one or more physical storage locations (e.g., disks) such as disk 710. Thus, the host sends the READ/WRITE command to a switch implementing virtualization functionality (e.g., mapping functionality) to enable the switch to send the READ/WRITE command to the appropriate physical storage devices (e.g., disks). In this example, since the first switch 704 is the first to receive the READ/WRITE command, the first switch 704 would typically perform the mapping between virtual-physical address(es) of the physical storage locations. Unfortunately, since the first switch is not the closest to the disk 710, the network performance is not optimized. This is significant, since for processes such as striping, mirroring, etc, the transmission time between the switch 704 and disk 710 is additive over the multiple data transfers.

As set forth above, the configuration of network devices such as switches is performed to enable virtualization functions to be performed by the switch closest to the pertinent node(s). More specifically, the same configuration information is stored among multiple switches, enabling each of the configured switches to process traffic for the same virtual storage devices. Such a network configuration may be performed statically or dynamically. An example data structure for storing configuration information and an example method for optimizing performance will be described in further detail below with reference to FIG. 8 and FIG. 9, respectively.

Figure 8:
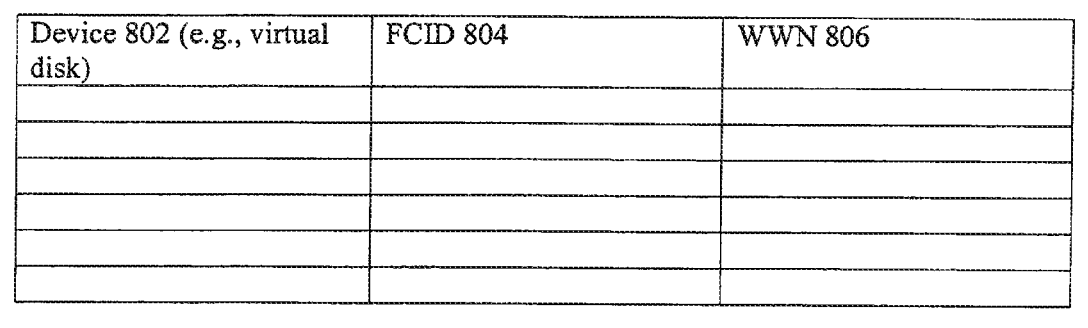

The configuration information configured for each switch may be stored using a variety of data structures or registers. FIG. 8 is a diagram illustrating an example table configured on a switch in accordance with one embodiment. Each switch stores device information for a plurality of devices (e.g., storage devices), where the device information for each of the devices identifies both a physical address and a virtual address. In this example, each virtual storage device 802 is identified, as well as the physical address(es) 804 for the virtual storage device 802. In a Fibre Channel network, a World Wide Name (WWN) is associated with each device. Thus, the World Wide Name (WWN) may also be identified, as shown at 806.

Figure 9:
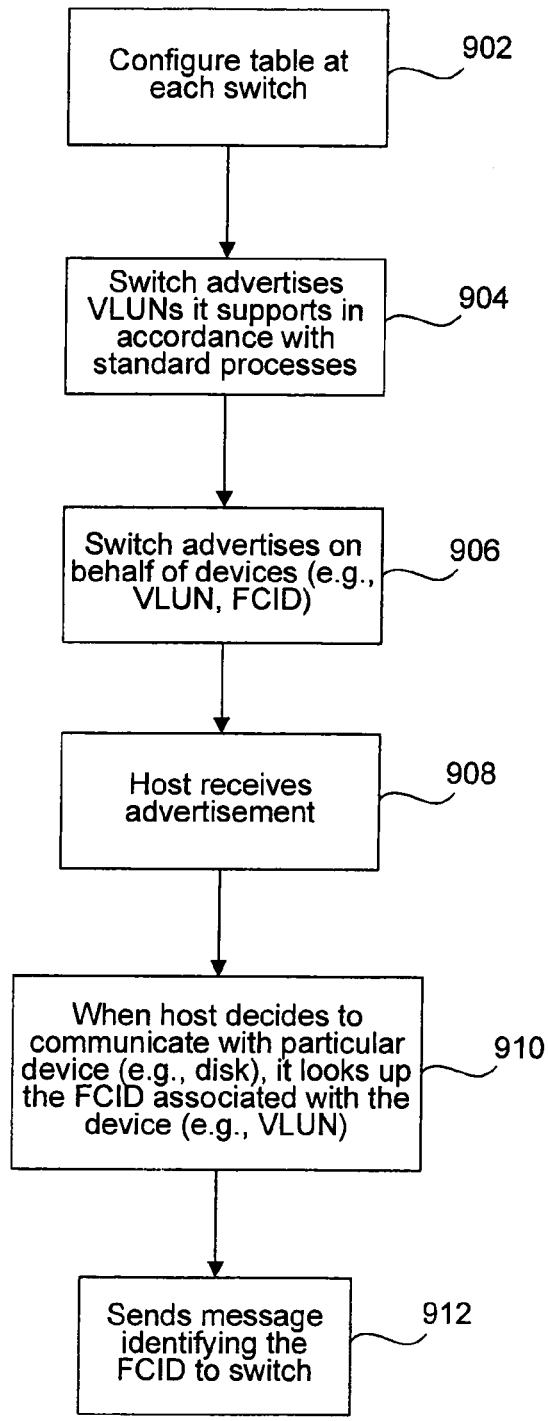
FIG. 9 is a process flow diagram illustrating a method of optimizing performance in a network implementing virtualization in accordance with one embodiment.

FIG. 9 is a process flow diagram illustrating a method of optimizing performance in a network such as a SAN including a plurality of storage devices, where the SAN implements virtualization. Once the device information is configured at a switch at 902, the switch advertises the virtual storage devices (e.g., VLUNs) it supports in accordance with standard advertisement processes at 904. Specifically, the switch advertises on behalf of the virtual storage devices by sending an advertisement including device information for one or more devices, where the device information for each of the devices identifies a physical address and a virtual address as shown at 906, thereby enabling a host receiving the advertisement to obtain the physical address associated with the virtual address for one of the devices. Specifically, in a Fibre Channel network, the virtual address identifies a VLUN and the physical address is a FCID. When the host receives the advertisement at 908, the host can store the VLUN-FCID mapping so that it can subsequently look up the physical address (e.g., FCID) associated with a particular virtual device (e.g., VLUN) at 910 when it wishes to communicate with that virtual device. The host then sends a message addressed to the physical address (e.g. FCID) to the switch at 912, as desired.

In order to implement the method described above with reference to FIG. 9, each switch is configured with the device information for various devices (e.g., storage devices), as set forth above. In addition, the switches are configured to send an advertisement including the device information for at least one of the devices, thereby enabling a host receiving the advertisement to obtain the physical address associated with the virtual address for one of the plurality of devices. Thus, a single advertisement may include device information for one or more devices. In addition, the switches may be adapted for receiving a message from a host identifying a physical address and processing the message to access the physical address.

Alternatively, the switch need only advertise that it services particular virtual addresses, thereby enabling a host to send a command to the switch by identifying only the virtual address. The switch may then perform the appropriate virtual-physical address mapping to complete the command requested by the host.

In accordance with another aspect, the "CPU efficiency" of a CPU may be ascertained. This may be accomplished by measuring data associated with the utilization of the CPU during host inputs and/or outputs such as those performed in a network implementing virtualization. In this manner, the impact of virtualization on a CPU may be determined.

Figure 10:
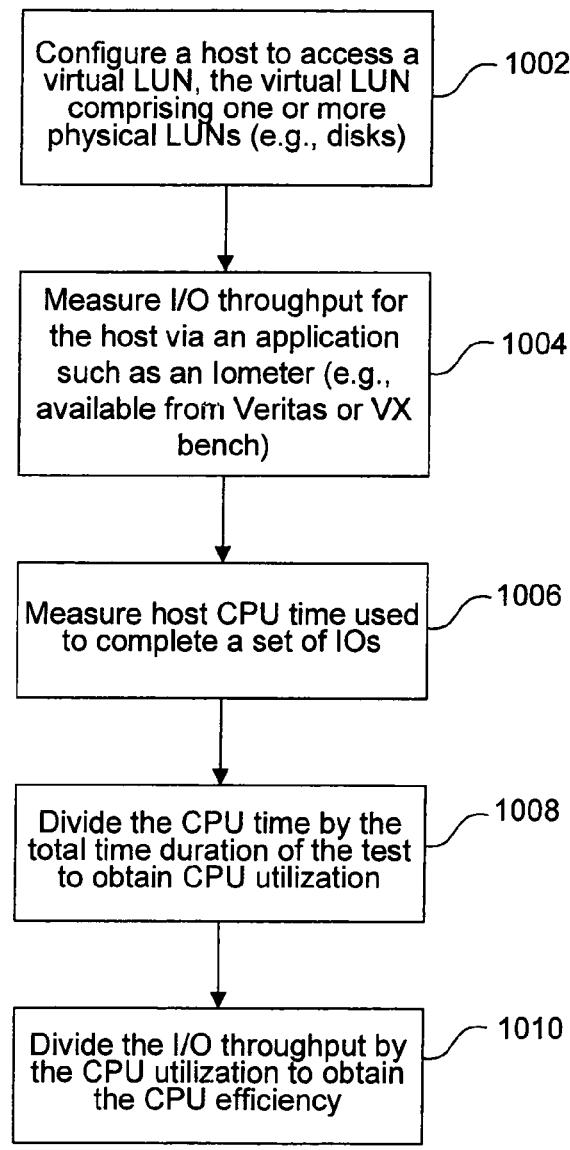
FIG. 10 is a process flow diagram illustrating a method of ascertaining the impact of storage virtualization on a CPU in accordance with one embodiment.

FIG. 10 is a process flow diagram illustrating a method of ascertaining the impact of storage virtualization on a CPU in accordance with one embodiment. Typically, a host is configured to access a virtual logical unit (VLUN) that includes one or more physical logical units (PLUNs), as shown at 1002. In order to ascertain the impact of storage virtualization on a CPU, a "CPU efficiency" is calculated. Specifically, the I/O throughput associated with the CPU is measured during a test period of time at 1004, where the I/O throughput quantifies an amount of data that is input and/or output. For instance, the I/O throughput may be measured using a tool such as an Iometer. The CPU time for the CPU to complete a set of inputs and/or outputs (corresponding to the amount of data input and/or output) during the test period of time is measured at 1006. The CPU time is then divided by the test period of time to obtain a CPU utilization at 1008. The I/O throughput is then divided by the CPU utilization to obtain the CPU efficiency associated with the CPU at 1010.

In accordance with another aspect, striping is performed to account for metadata stored at the beginning of partitions in storage devices such as disks. This may be accomplished by configuring a network device such as a switch to accurately calculate the start address of a partition, the data region within the partition, or the metadata region within the partition. In this manner, the speed with which memory may be accessed is improved.

Figure 11:
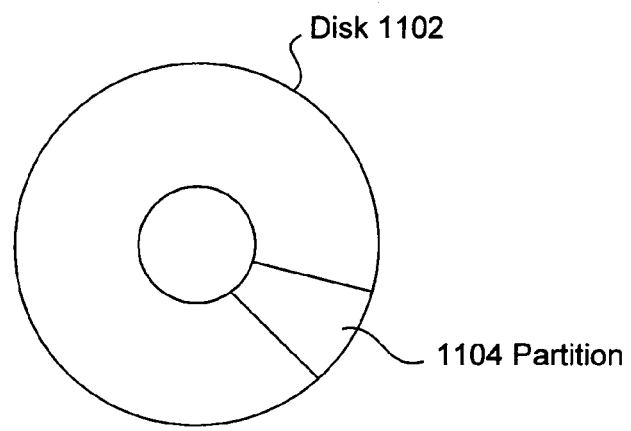
FIG. 11 is a simplified diagram illustrating a disk.

FIG. 11 is a simplified diagram illustrating a disk 1102. A disk 110 generally includes multiple partitions 1104. Sometimes, metadata may be stored in a partition. For instance, a metadata region may be written at the beginning of the partition. The metadata is generally associated with network virtualization functionality, the host operating system, host virtualization functionality, and/or application functionality. More specifically, metadata may include information such as volume hierarchy/configuration, mirror recovery logs, volume name, WWN, version information, timestamps, etc.

Applications are usually written so that they perform I/Os aligned to a stripe unit. Thus, the start address for application data should be aligned to the stripe unit size. If the start address for application data is not aligned to the stripe unit size, all I/O operations from the application would result in unaligned physical disk I/Os. Due to the slow speed with which a disk rotates, this will significantly degrade performance.

Figure 12:
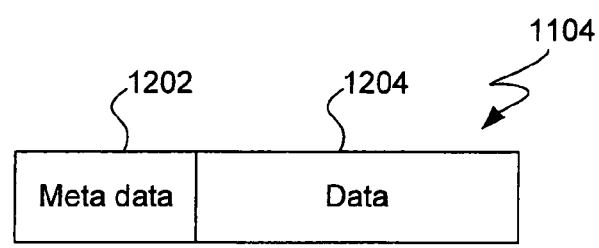
FIG. 12 is a diagram illustrating a striped volume in which metadata is stored in accordance with one embodiment.

In order to improve performance in a system in which metadata is stored, configuration is performed to take into account the metadata region. FIG. 12 is a diagram illustrating a striped volume in which metadata is stored in accordance with one embodiment. In this example, the partition 1104 includes a metadata region 1202 and a data region 1204. In accordance with various embodiments, a striped volume is configured to account for the metadata.

In accordance with one embodiment, a striped volume in which both metadata and data are stored in a storage area network is configured to enable the start address of a partition in a storage volume to be ascertained. First, the striped volume in which both metadata and data are stored is identified. In addition, the size of the metadata region stored for each partition in the striped volume and the stripe size for data stored in the storage area network are ascertained. A start address for a partition in the striped volume may then be determined, where the start address for the partition in the striped volume is a stripe-aligned address at which data is stored less a sum of the metadata region size for the partition.

In accordance with another embodiment, a striped volume in which both metadata and data are stored in a storage area network is configured to enable the application data start address to be ascertained. First, the striped volume in which both metadata and data are stored is identified. The size of the metadata stored for each partition in the striped volume is ascertained. In addition, the stripe size for data stored in the storage area network is also ascertained. An application data start address identifying a start address at which data is stored is then ascertained, where the application data start address is the sum of the start address for the partition in the striped volume and the metadata region size for the partition.

The above-described embodiments may be implemented separately or in combination with one another. While the embodiments set forth above may be applied in a SAN, these examples are merely illustrative, and therefore the embodiments disclosed herein may be applied in other networks, as well. Similarly, while some of the embodiments disclosed are described with reference to a Fibre Channel network, the disclosed embodiments may be implemented in other types of networks.

An apparatus (e.g. switch or router) may be specially constructed for the disclosed purposes, or may be a general purpose programmable machine selectively activated or reconfigured by a computer program stored in memory. The processes presented herein are not inherently related to any particular switch or other apparatus.

Generally, the disclosed techniques may be implemented on software and/or hardware. For example, it can be implemented in an operating system kernel, in a separate user process, in a library package bound into network applications, on a specially constructed machine, or on a network interface card.

A software or software/hardware hybrid route optimization system may be implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the systems may be specially configured switches such as the MDS series of Fibre Channel switches, including Cisco MDS series 9200 and 9500 available from Cisco Systems, Inc. of San Jose, Calif. A general architecture for some of these machines will appear from the description given below. In an alternative embodiment, the methods and systems may be implemented on a general-purpose network host machine such as a personal computer or workstation. Further, the disclosed embodiments may be at least partially implemented on a card (e.g., an interface card) for a network device or a general-purpose computing device.

Figure 13:
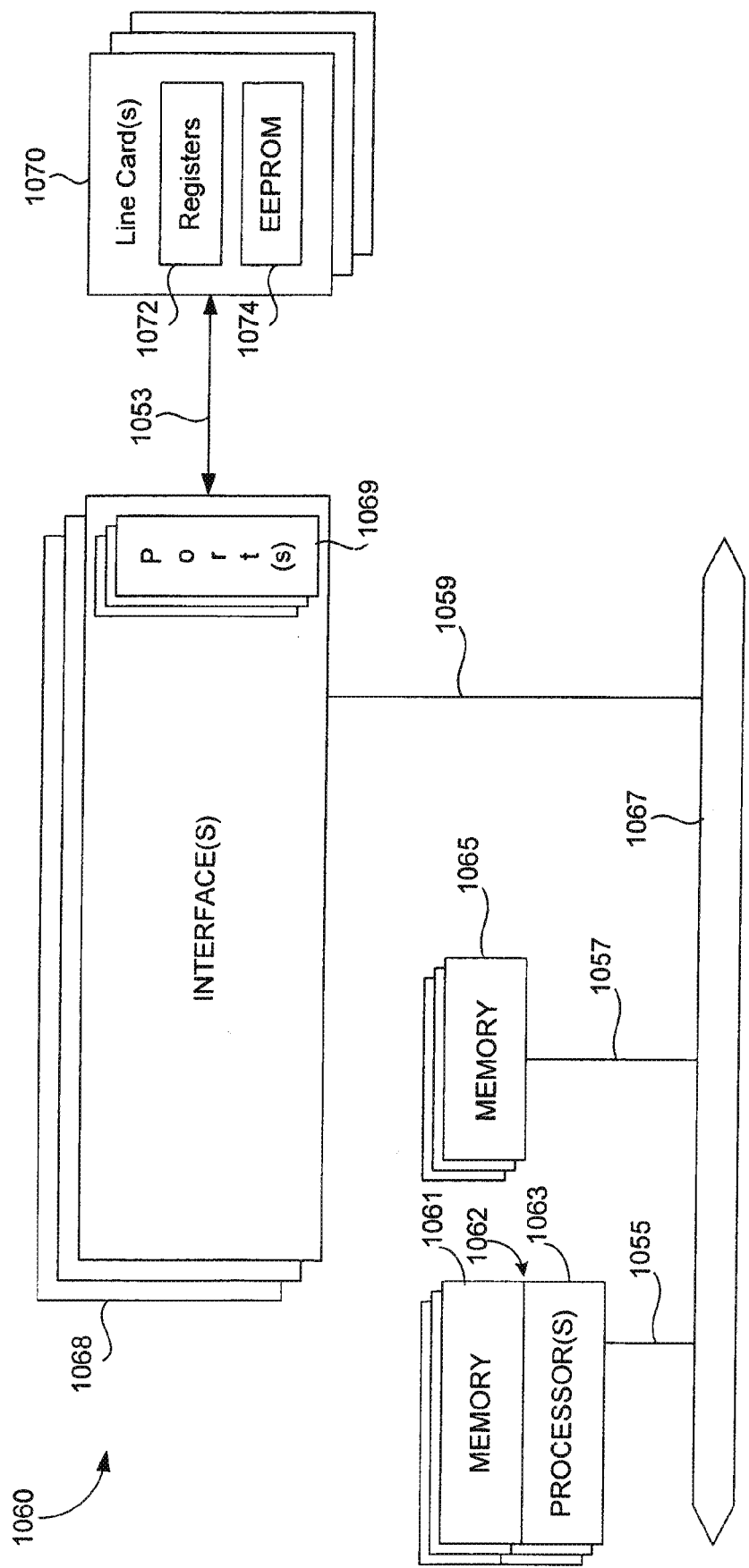
FIG. 13 is a diagrammatic representation of a network device in which various embodiments may be implemented.

Referring now to FIG. 13, a network device 1060 suitable for implementing the disclosed techniques includes a master central processing unit (CPU) 1062, interfaces 1068, and a bus 1067 (e.g., a PCI bus). When acting under the control of appropriate software or firmware, the CPU 1062 may be responsible for implementing specific functions associated with the functions of a desired network device. For example, when configured as an intermediate router, the CPU 1062 may be responsible for analyzing frames, encapsulating frames (or packets), and forwarding frames for transmission to a set-top box. The CPU 1062 preferably accomplishes all these functions under the control of software including an operating system (e.g. Windows NT), and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

The interfaces 1068 are typically provided as interface cards (sometimes referred to as "line cards"). Generally, they control the sending and receiving of data frames over the network and sometimes support other peripherals used with the network device 1060. Among the interfaces that may be provided are Fibre Channel ports, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as frame switching, media control and management. By providing separate processors for the communications intensive tasks, these interfaces allow the master microprocessor 1062 to efficiently perform routing computations, network diagnostics, security functions, etc.

Although the system shown in FIG. 13 illustrates one example network device, it is by no means the only network device architecture on which the disclosed embodiments can be implemented. For example, an architecture having a single processor that handles communications as well as routing computations, etc. is often used. Further, other types of interfaces and media could also be used with the network device.

Regardless of the network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the disclosed embodiments relate to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

In the above description, the term "frame" is used throughout. However, the term "frame" is intended to be used interchangeably with the term "packet." Accordingly, the term "frame" is intended to be interpreted broadly rather than narrowly.

While the disclosed embodiments have been particularly shown and described with reference to specific embodiments thereof, it will be understood by those skilled in the art that changes in the form and details of the disclosed embodiments may be made without departing from the spirit or scope of the disclosed embodiments. For instance, it will be appreciated that at least a portion of the functions described herein could be performed by one or more devices, e.g., by a microprocessor, by a cluster of microprocessors, etc. Considering these and other variations, the scope of the disclosed embodiments should be determined with reference to the appended claims.

What is claimed is:

1. A method, comprising:
identifying a stripe size, the stripe size being a size of data to be written to or read from one of a plurality of columns;
determining a host IO size, the host IO size being a size of data to be received from or transmitted to a host, thereby enabling the data to be stored to or read from storage including a plurality of columns, wherein determining the host IO size includes calculating a product of the stripe size and a number of the plurality of columns;
setting the host IO size to identify an amount of data to be received from or transmitted to the host;
obtaining data from the host or transmitting data to the host, wherein the size of the data obtained or transmitted conforms to the host IO size; and
performing striping across the plurality of columns for the data obtained from the host or transmitted to the host such that data written to or read from one of the plurality of columns conforms to the stripe size.

2. The method as recited in claim 1, further comprising:
receiving a command from the host, the command being a read or write command.

3. The method as recited in claim 1, further comprising:
sending a XFR_RDY command identifying the host IO size to the host, wherein the method is performed in a Fibre Channel network.

4. The method as recited in claim 3, further comprising:
receiving data from the host, wherein the size of the data is equal to the host IO size.

5. The method as recited in claim 1, wherein each of the plurality of columns is a disk.

6. The method as recited in claim 1, wherein determining the host IO size comprises:
identifying a minimum of a size of remaining data associated with the host IO and the product of the stripe size and the number of columns.

7. The method as recited in claim 1, wherein determining, setting the host IO size and performing striping are performed until striping has been completed for the data.

8. A method, comprising:
receiving a command from a host, the command being a request to store or retrieve data, the command indicating a size of the data to be stored or retrieved;
ascertaining whether the size of the data associated with the command is greater than a product of a configured stripe size and number of a plurality of columns; and
reading data from the plurality of columns or writing data to the plurality of columns, wherein reading data or writing data is performed in accordance with the configured stripe size and the command.

9. The method as recited in 8, further comprising:
when the size of the data associated with the command is not greater than the product of the configured stripe size and the number of columns, performing striping according to the configured stripe size.

10. The method as recited in claim 8, further comprising:
when the size of the data associated with the command is greater than the product of the configured stripe size and the number of columns, determining a host IO size, setting a host IO size, and obtaining data conforming to the host IO size from the host or transmitting data conforming to the host IO size to the host by performing striping across a plurality of columns, wherein the data written to or read from each of the plurality of columns conforms to the configured stripe size.

11. The method as recited in claim 8, wherein the command is a read command.

12. The method as recited in claim 10, further comprising:
sending a request for data to the host, wherein the size of data requested conforms to the host IO size.

13. The method as recited in claim 8, wherein receiving the command from the host comprises:
receiving a request from the host that identifies a virtual storage location and wherein the plurality of columns are associated with a plurality of physical storage locations.

14. The method as recited in claim 10, wherein determining, setting, and obtaining or transmitting are performed dynamically until striping has been completed for the data.

15. The method as recited in claim 14, wherein determining the host IO size comprises:
identifying a minimum of a size of the remaining data associated with the command and a product of the stripe size and the number of columns;
when the minimum is a size of the remaining data associated with the command, the host IO size is the size of the remaining data; and
when the minimum is a product of the stripe size and the number of columns, the host IO size is a product of the stripe size and the number of columns.

16. The method as recited in claim 8, wherein the command is a write command.

17. A non-transitory computer-readable storage medium storing thereon computer-readable instructions, comprising:
instructions for identifying a striped volume in which both metadata and data are stored in a storage area network;
instructions for identifying a size of the metadata stored for each partition in the striped volume;
instructions for identifying a stripe size for data stored in the storage area network; and
instructions for calculating a start address for a partition in the striped volume, wherein the start address for the partition in the striped volume is a stripe aligned address at which data is stored less a sum of the metadata region size for the partition.

18. An apparatus, comprising:
a processor; and
a memory, at least one of the processor or the memory being adapted for:
identifying the striped volume in which both metadata and data are stored in a storage area network;
identifying a size of the metadata stored for each partition in the striped volume;
identifying a stripe size for data stored in the storage area network; and
calculating an application data start address identifying a start address at which data is stored, wherein the application data start address is the sum of the start address for the partition in the striped volume and the metadata region size for the partition.

19. The method as recited in claim 1, wherein the method is performed in a network implementing virtualization.

* * * * *